Dec. 8, 1970  G. DANKOWSKI  3,545,294

DRIVE BELT TENSIONER

Filed April 10, 1969

GERHARD DANKOWSKI
INVENTOR

BY Herbert J. Brown

ATTORNEY

United States Patent Office 3,545,294
Patented Dec. 8, 1970

3,545,294
DRIVE BELT TENSIONER
Gerhard Dankowski, 3530 Dilido Road,
Dallas, Tex. 75218
Filed Apr. 10, 1969, Ser. No. 815,095
Int. Cl. F16h 7/12
U.S. Cl. 74—242.1                                                 1 Claim

ABSTRACT OF THE DISCLOSURE

An eccentric arm and assembly for tightening a drive belt and including a die casting having a hub, a flat friction ring around the hub, a lateral arm on the side of the hub opposite the friction ring and a hexagonal spaced on the extending end of the arm. Opposite sides of the arm are flat and parallel so as to provide wrench surfaces. The assembly includes a pulley on the spacer and a friction disc on a supporting member. In its preferred form, the construction includes a threaded axial opening in the hub and receives a bolt which extends through the supporting member and the friction disc.

---

This invention relates to drive belt tensioners and has reference to that type of tensioner wherein an idle pulley is adjustably mounted to take up slack in the belt.

An object of the invention is to provide a drive belt tensioner capable of close adjustment.

Another object of the invention is to provide a simplified drive belt tensioner which requires very little machining and one which is economical to make.

These and other objects of the invention will become apparent from the following description and the accompanying drawing, in which.

Figure 1:
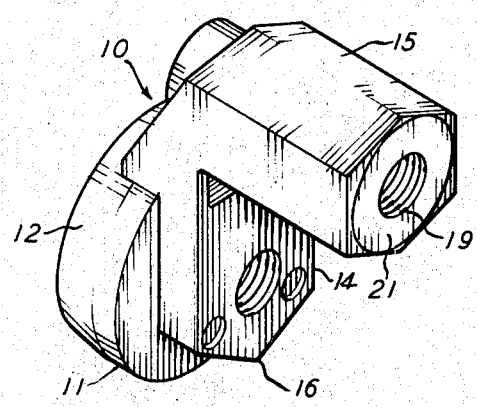
FIG. 1 is a front perspective view of the primary unit of the invention and showing the integral hub, friction ring, arm and pulley supporting spacer.
Figure 2:
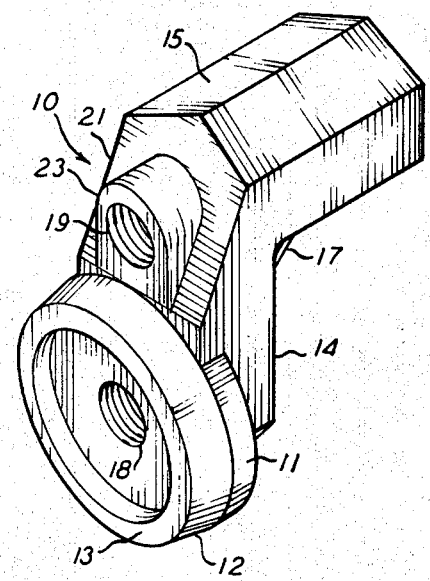
FIG. 2 is a rear perspective view of the unit illustrated in FIG. 1.

The unit 10, best shown in FIGS. 1 and 2, is generally comprised of a hub 11, a friction ring 12 having a flat outer surface 13, a lateral arm 14 extending from the hub and a hexagonal spacer 15 on the extending end of the arm. The unit 10 is die cast and it will be noted that the arm 14 is thicker than the hub 11, from which it projects, thus lending strength where these two parts (11 and 14) are joined. The opposite sides, not numbered, of the arm are flat and parallel so as to provide wrench surfaces. It is also to be noted that the inner end of the arm 14 extends beyond the center of the hub 11 where it is pointed, at 16, for guiding a wrench into place. Also there are integral gussets 17 between the arm 14 and the spacer 15 to lend strength to the last named parts.

The hub 11 and the adjoining part of the arm 14 are drilled and tapped to provide a threaded opening 18 through the axis of the hub. Similarly, the spacer 14 is axially drilled and tapped, at 19, to provide means for rotatably mounting an idle wheel 20 (FIG. 4) thereon. As shown only in FIG. 1, there is a slightly raised flat circular area 21 on the extending end of the spacer 15, which surface contacts the idle wheel 20 near its center.

The inner end of the spacer 15 and the extending rear portion of the arm 14 are beveled, at 21, and a boss 23 projects from the beveled surface and includes the tapped hole 19 therethrough.

Figure 3:
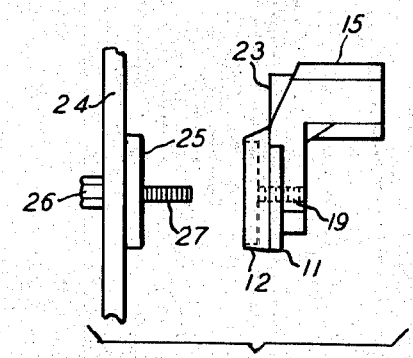
FIG. 3 is an exploded reduced scale side elevational view of the assembly but not including the idle pulley.

The arm unit 10, as shown in FIG. 3, is mounted on a supporting member 24 having a disc 25 securely mounted thereon. The outer surface of the disc is flat for frictional engagement with the flat surface 13 of the hub ring 12. A bolt 26 is received in aligned holes, not shown, in the supporting member 24 and the disc 25, and the threads 27 of the bolt engage the threads 18 in the hub 11. Within the scope of the invention the position of the bolt 26 could be reversed; for example, the aligned holes in the support 24 and disc 25 could be threaded (not shown) and in which case the axial opening 18 in the hub 11 and the arm 14 would be without threads. Another bolt 32, indicated in schematic view, FIG. 4, engages the threads 19 in the spacer 15 for rotatably supporting the idle wheel 20.

Figure 4:
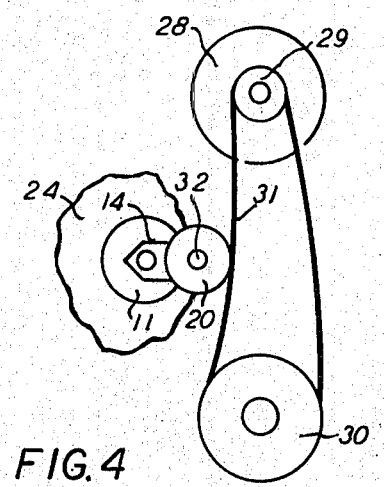
FIG. 4 is a schematic view showing an end view of a motor and drive pulley thereon, a driven pulley, a drive belt around the two pulleys and the present assembly coacting with the belt.

An application of the invention is shown in FIG. 4. A motor 28 having a drive pulley 29 is connected with a driven pulley 30 by a belt 31. The described belt tensioner is positioned along side of the belt 31 and the idle pulley makes contact therewith in a direction perpendicular to the axes of the pulleys 29 and 30. By applying a wrench to the sides of the arm 14, the idle pulley 20 may be minutely adjusted; however, if the bolt 26 is not tight the wrench may be applied to the hexagonal spacer for adjustment, after which the bolt is tightened.

The invention is not limited to the construction herein shown and described.

What is claimed is:

1. A drive belt tensioner including a fixedly supported flat surface, an eccentric unit and an idle pulley, said eccentric unit being comprised of a hub, a lateral arm extending from said hub and having opposing parallel sides, means supporting said idle pulley on said arm, said means supporting said idle pulley including a hexagonal spacer projecting from said arm, the axis of said pulley being spaced from and parallel with the axis of said hub, a ring on said hub and having a flat outer surface and means rotatably mounting and tightening the flat surface of said ring against said supported flat surface.

References Cited
UNITED STATES PATENTS
| | | | |
|---|---|---|---|
| 1,319,122 | 10/1919 | Shelton | 74—242.1X |
| 3,071,980 | 1/1963 | Brewer | 74—242.1 |
| 3,358,521 | 12/1967 | Browning | 74—242.1 |

JAMES A. WONG, Primary Examiner